Figures 1, 2, 3:
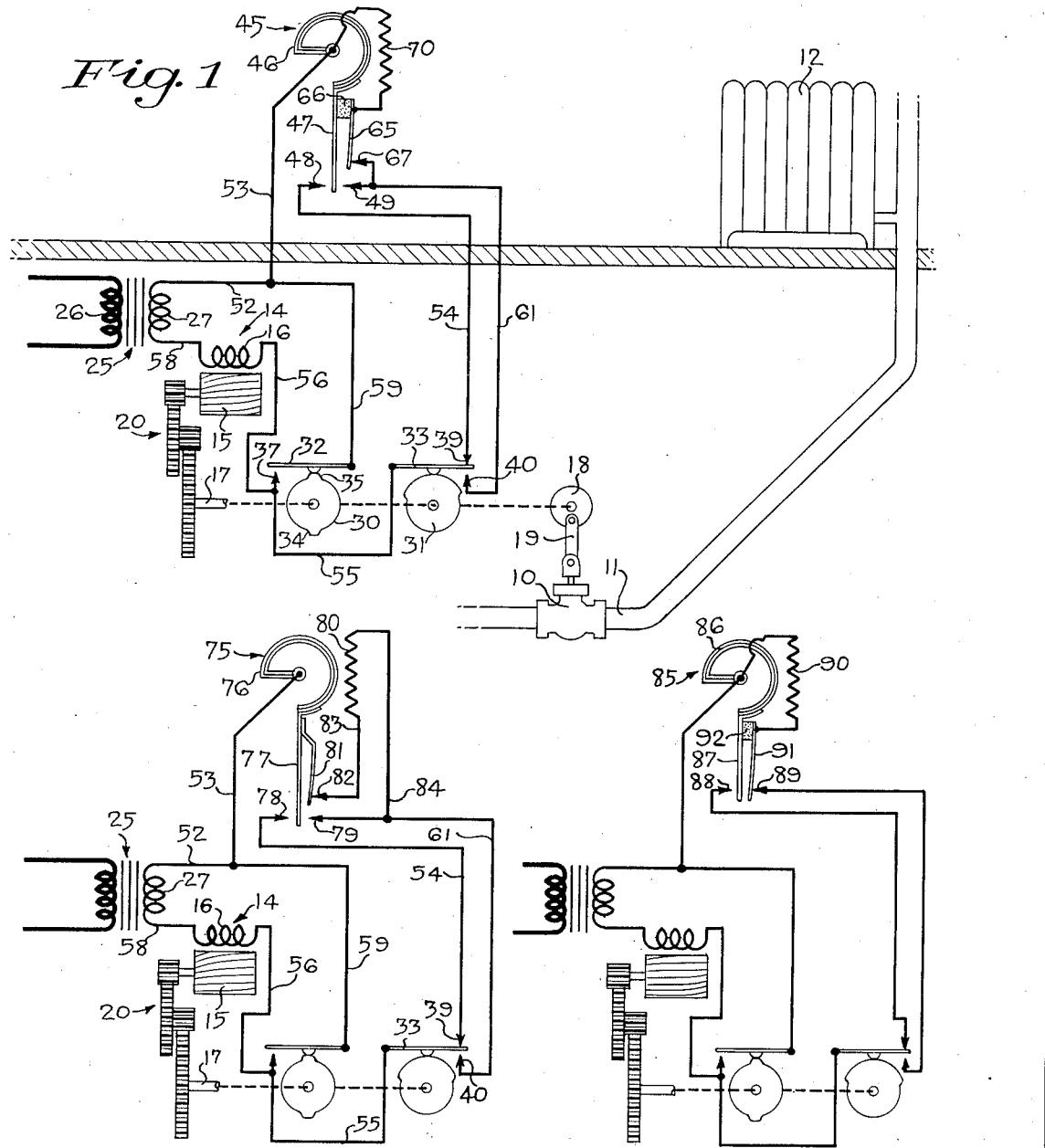

Jan. 30, 1940.  G. A. CHURCHILL  2,188,808
TEMPERATURE CONTROL SYSTEM
Filed Feb. 27, 1937

Inventor
Gilbert A. Churchill
By George H Fisher
Attorney

Patented Jan. 30, 1940

2,188,808

UNITED STATES PATENT OFFICE 2,188,808

TEMPERATURE CONTROL SYSTEM

Gilbert A. Churchill, Milwaukee, Wis., assignor to Minneapolis-Honeywell Regulator Company, Minneapolis, Minn., a corporation of Delaware Application February 27, 1937, Serial No. 128,251

7 Claims. (Cl. 236—68)

This application relates to a temperature control system and more particularly to means for increasing the rate of movement of the thermostatic controller between two of its extreme positions.

It has been previously proposed in the art of temperature controlling to provide a heater adjacent the thermostatic switch or other controller, which heater is energized so long as the heat regulating member is in its heat increasing position. The effect of this heater is to cause the thermostatic controller to move towards its hot position before the temperature of the controlling medium has arrived at a value which would normally cause the controller to move to that position. By so providing the heater to hasten the movement of the thermostat from its cold to its hot position the advantage was obtained that the operation of the heat producing device, such as a radiator or furnace, was lessened or interrupted before the temperature in the room had actually attained the desired value so that provision was made for the time lag between the time of generation of heat in the radiator or furnace and delivery of the heat to the space surrounding the thermostat.

While the previously described system had certain advantages over the prior art, it had the disadvantage that the thermostat was moved from its cold to its hot position within a predetermined period of time regardless of the speed with which the controlling medium was being heated up and regardless of the temperature of the controlling medium at the start of the heating cycle. Thus in the case of a night shut-down after which it is necessary to raise the temperature of the room by a very large amount, the presence of the auxiliary heater adjacent the thermostat seriously retarded the warming up of the room. This was due to the fact that the effect of the heater was to periodically interrupt the generation of heat even though the temperature of the controlling medium was far below that desired. Furthermore, during normal operation, the fixed periods of operation did not make provision for varying outdoor temperatures. As the outdoor temperature becomes colder, it obviously becomes desirable to have longer periods of burner operation. It has accordingly been proposed to provide an arrangement wherein the auxiliary heat normally applied to the thermostatic controller is not applied until after the temperature has risen to a predetermined value higher than the value corresponding to the cold position of the thermostat but lower than that corresponding to the hot position of the thermostat. This arrangement is shown and described in the application of Paul F. Shivers, Serial No. 604,637, filed April 11, 1932. With the arrangement described in the Shivers application, the action of the thermostat is not modified until the temperature has already reached the value above that corresponding to the cold position of the thermostat so that in the case of a morning pick-up, for example, the furnace will be allowed to operate continuously until the temperature is approximately the desired value. Moreover, the period of burner operation will be variable by reason of the variable time required for the room temperature to rise sufficiently to cause energization of the heater. This system has been found to work extremely well and has far superior results to the previously described system.

The arrangement described in the Shivers application, however, is not adapted to that type of control system wherein a regulating device is positively driven to each of its positions. The Shivers application relates only to that type of system wherein a device is driven positively in one direction only and moved in the other direction by a spring or some other biasing means. In certain types of systems it is highly desirable to positively drive a device in both directions. This type of system is characterized by a thermostatic controller which is movable between two opposite positions in each of which the controller is effective to apply power to some regulating device. The present invention is particularly concerned with the latter type of system.

An object of the present invention is to provide in a temperature control system of the type wherein upon a thermostatic switch moving to either of two extreme positions, power is applied to a regulator for a condition changing means to cause the regulator to move towards a corresponding extreme position, means immediately effective when the temperature changes from the value required to move the thermostatic switch to one of its extreme positions in a direction such as to move the thermostatic switch towards its other extreme position, to cause said switch to move towards its other position at a rate faster than that due to the temperature change.

A further object of the present invention is to provide a temperature control system of the type set forth in the previous object wherein the means for moving the thermostatic switch at a faster rate is a heater located in proximity to the thermostat.

In its broader sense, an object of the invention is to provide in a condition control system of the type wherein upon a condition responsive controller moving to either of two extreme positions, power is applied to a regulator for a condition changing means to cause the regulator to move towards a corresponding extreme position, means effective upon the controlling condition changing from the value required to move it to one of its extreme positions in a direction tending to move the controller towards its other extreme position to cause the controller immediately to move towards the other extreme position at a rate faster than that due merely to a change in the controlling condition.

Other objects of the invention will be apparent from a consideration of the accompanying specification, claims and drawing.

For a fuller understanding of my invention reference is made to the accompanying drawing, wherein Figure 1 is a schematic view of one species of my improved control system;

Figure 2 is a schematic showing of a portion of a modified form of my control system. and Figure 3 is a schematic view of a portion of a further modification of the control system.

Referring to the drawing in more detail, the invention is illustrated as applied to a temperature control system. While the particular heating arrangement to which the control is applied forms no part whatsoever of the invention, the control system is shown for purposes of illustration as employed with a steam heating system wherein the thermostatic controller is effective to regulate a valve controlling the supply of steam to radiators. In the drawing, the valve is indicated by the reference numeral 10 and controls the flow of steam through a pipe 11 to radiators 12, only one of which is shown.

The valve 10 is driven by a motor 14. The motor 14 is shown for purposes of illustration as an induction motor comprising a rotor 15 and a field winding 16. The motor 14 drives through a reduction gear train 20, a shaft 17 which has secured thereto a crank disc 18. A link 19 serves to operatively connect the crank disc 18 with the stem of valve 10. It will be readily seen that in the position illustrated, the stem of the valve is in its lowermost position which corresponds to the closed position of the valve, and if the crank disc is rotated 180° the stem will be in its uppermost position and the valve will be open.

A step-down transformer 25 supplies power for the operation of the system. This transformer comprises a line voltage primary 26 and a low voltage secondary 27.

Also secured to shaft 17 are two cams 30 and 31. These cams are adapted to cooperate with switch blades 32 and 33 respectively. Cam 30 is provided with two toe portions 34 and 35 spaced 180° apart in positions corresponding to the open and closed positions of the valve. Upon either of these toe portions engaging the cam follower of switch arm 32, this switch arm is moved away from a contact 37 with which it is normally biased into engagement.

The cam 31 is raised over a portion somewhat less than 180° of its periphery. When the cam follower of switch blade 33 is in engagement with the raised portion, the switch blade 33 is maintained in engagement with a contact 39. When the cam follower 33 is in engagement with the lower or heel portion of cam 31, the switch blade is in engagement with contact 40.

As will be apparent from the subsequent description, the switch consisting of switch blade 32 and contact 37 functions as a maintaining switch to continue operation of the motor through a half cycle after the same has been initially placed into operation. The switch consisting of switch blade 33 and contacts 39 and 40 functions as a cycling switch to terminate operation of the motor at the end of each half cycle.

The thermostatic controller is generally indicated by the reference numeral 45. Since the illustrative form of the temperature control system is an electrically operated control system, the controller 45 is in the form of a switch. The controller comprises a bimetal element 46 operatively connected to a switch blade 47. Switch blade 47 is movable between two contacts 48 and 49. The bimetal element is so disposed that switch blade 47 is moved into engagement with contact 48 when the temperature has fallen to a minimum desired value and moves into engagement with contact 49 when the temperature rises to a maximum desired value. Contacts 48 and 49 may accordingly be termed cold and hot contacts. Similarly, when the switch is in a position in which switch blade 47 is in engagement with contact 48 the switch may be termed as being in its cold position and when the same is in engagement with contact 49, in its hot position.

The system so far described is an entirely conventional system having no novelty whatsoever. Before describing the improved features of the present system, the operation of the conventional portion will briefly be described. Upon the temperature dropping to the point where the thermostatic switch is in its cold position, namely, in engagement with contact 48, a circuit is initially closed to field winding 16 of the motor as follows: from the upper terminal of secondary 27 through conductors 52 and 53, bimetal element 46, switch blade 47, contact 48, conductor 54, contact 39, switch blade 33, conductors 55 and 56, field winding 16 and conductor 58 to the other terminal of secondary 27. The above traced circuit causes the energization of the field winding 16 with the resultant energization of the motor 14. The energization of motor 14 causes rotation of shaft 17 and movement of valve 10 towards open position. The rotation of shaft 17 also causes the rotation of cams 30 and 31 in a clockwise direction. The effect of the rotation of cam 30 is to permit the cam follower of switch blade 32 to move off of the toe portion 35 causing the switch blade 32 to move into engagement with contact 37. As soon as this takes place, the following maintaining circuit is established to motor field winding 16: from the upper terminal of secondary 27 through conductors 52 and 59, switch blade 32, contact 37, conductor 56, field winding 16 and conductor 58 to the other terminal of secondary 27. It will be noted that this new circuit is independent of the thermostat 45 so that the motor will continue in rotation until the toe portion 34 of cam 30 is moved into a position where it again separates switch blade 32 from contact 37. In the meantime the movement of cam 31 has been sufficient to bring the heel portion of cam 31 under the cam follower of switch arm 33 to permit the latter member to move out of engagement with contact 39 and into engagement with contact 40. Accordingly, when switch 32 is again separated from contact 37, the initial energizing circuit for field winding 16 has been interrupted so that the motor ceases its operation. As will be obvious from the preceding description, the valve will be in its wide open position when such operation is terminated.

With the valve in its wide open position, steam is admitted to the radiators 12 and the temperature of the space surrounding thermostat 49 eventually begins to rise. After this action has continued for sufficiently long, the temperature will have risen to the point where switch arm 47 is moved into engagement with contact 49. Upon this taking place the following energizing circuit is established to field winding 16: from the upper terminal of secondary 27 through conductors 52 and 53, bimetal element 46, switch blade 47, contact 49, conductor 61, contact 40, switch blade 33, conductors 55 and 56, field winding 16 and conductor 58 to the other terminal of secondary 27. The establishment of this energizing circuit for field winding 16 results in the re-energization of motor 14 which causes the valve 10 to be moved towards closed position and for cams 30 and 31 to again be turned in a clockwise direction. The movement of cam 30 in a clockwise direction causes the toe portion 34 of cam 30 to pass from underneath the cam follower of switch blade 32 allowing the latter member to again move into engagement with contact 37. The moving of switch blade 32 into engagement with contact 37 re-establishes the maintaining circuit for field winding 16 previously traced and insures that the motor will continue in operation until the valve is fully closed, at which time the parts will assume the position shown in the drawing wherein the operation of the valve is interrupted.

As previously stated, the portion of the apparatus so far described is old in the art. It will be readily apparent from the preceding description that the closing of the valve 10 is not effected until the heat has been delivered to the radiator 12 and has increased the temperature of the room to a point where the temperature adjacent thermostat 45 is sufficient to cause the same to move into engagement with contact 49. By this time, however, the radiator 12 will be sufficiently warm that the temperature will continue to rise above the temperature required to move the switch blade into engagement with contact 49. In other words, the temperature will "overshoot". In the improved thermostat of the present invention, provision is made for avoiding this objection.

Referring to the drawing, an auxiliary switch blade is designated by the reference numeral 65. This switch blade 65 is secured to the switch blade 47 in such a way that the switch blade 65 is insulated from the switch blade 47. A member 66 of insulating material is shown as interposed between the two switch blades 47 and 65. The switch blade 65 is adapted to cooperate with a fixed contact 67 and is normally so adjusted that it will be maintained in engagement with contact 67 until switch blade 47 engages with contact 48. In other words, when switch arm 47 is in engagement with contact 48, the switch blade 65 is separated from its contact 67 but is almost immediately re-engaged upon switch arm 47 moving away from contact 48.

The switch consisting of switch blades 65 and 67 controls a heater 70 which is located in proximity to the bimetallic element 46. The heater 70 is shown in the form of an electrical heater, one terminal of which is connected to bimetal 46 and the other terminal of which is connected to switch blade 65.

Referring now to the operation of the improved system, the energizing circuit for heater 70 is as follows: from the upper treminal of secondary 27 through conductors 52 and 53, heaters 70, switch blade 65, contact 67, conductor 61, contact 40, switch blade 33, conductors 55 and 56, field winding 16 and conductor 58 to the other terminal of secondary 27. Due to the relatively high resistance of heater 70, this circuit does not cause sufficient energization of field winding 16 to cause operation of motor 14. It will be noted that this circuit is controlled by two switches in series, one the cycling switch constituted by switch blade 33 and contact 40, and the other the switch constituted by switch blade 65 and contact 67. Accordingly, in order for the heater 70 to be energized it is necessary for both of these switches to be closed. Since the cycling switch 33 and contact 40 are closed only when the valve is in its open position, the heater is never energized when the valve is in its closed position. Accordingly, the action of the system upon switch blade 47 moving from engagement with contact 49 into engagement with contact 48 is the same as that with any conventional system. In other words, upon switch blade 47 engaging contact 48 the valve 10 is moved to wide open position. In this position switch blade 33 is in engagement with contact 40. The heater 70 is not energized, however, due to the fact that upon switch blade 47 engaging contact 48 switch blade 65 is simultaneously separated from contact 67. Accordingly, auxiliary heat is not applied to the thermostatic element 46 until the temperature in the room has risen sufficiently by reason of the valve 10 being opened to raise the temperature to a point where contact arm 47 separates from contact 48. As soon as this takes place, switch blade 65 is again moved into engagement with contact 67 and the heater 70 is energized through the previously traced circuit.

The effect of the energization of heater 70 is to cause auxiliary heat to be supplied to the bimetal element 46 and to cause the same to be moved much more rapidly than otherwise from contact 48 into engagement with contact 49. Upon the switch arm 47 moving into engagement with contact 49 the motor is again placed in operation to cause the valve to be closed and to cause the cam 31 to be placed in the position shown in Figure 1 wherein the switch blade 33 is separated from contact 40 thus interrupting the circuit to the heater 70. The heater will not be again placed into operation until the valve has again been opened and the temperature again begins to rise to a point where switch arm 47 disengages contact 48. The effect of the de-energization of the heater 70 is to cause the thermostatic element 46 to cool off. Normally this rate of cooling will be sufficiently slow so that the continued increase in temperature or coasting of the temperature after the valve 10 has been shut, will compensate for the decrease in temperature due to cooling of the heater 70 so that switch blade 47 will not be moved back appreciably in the direction of contact 48. This is particularly true in view of the fact that the temperature in the room has already risen sufficiently to separate contact arm 47 from contact 48 before heater 70 is energized.

It will be readily seen from the preceding description that by means of my arrangement, it has been possible to obtain the advantages outlined for the arrangement in the Shivers application previously referred to, in a thermostat of the type which moves between two oppositely disposed positions in each of which it supplies power to a regulating means. In other words, with the arrangement of the present invention the action of the thermostat 46 is not modified until the temperature in the room has risen to a point sufficient to cause separation of switch arm 47 from contact 48. Thus there is no danger of the temperature in the room "drooping" by reason of the fact that the heat increasing means is interrupted too often for it to maintain a desired temperature. In the case of a morning pickup the action of the thermostat is not modified until the temperature has risen to a point above that corresponding to the cold position of the thermostat. As a result the temperature is allowed to rise almost to the exact point without interruption of the heat supply and then just as the temperature begins to approximate the desired point and shortly before it actually does the heat supply is interrupted so as to allow the temperature to coast up almost exactly to the desired value. As a result of this system an extremely accurate temperature regulation is obtained.

While it has been stated previously that blade 65 separates from contact 67 almost simultaneously with the engagement of switch blade 47 with contact 48, it is to be understood that the various contacts are adjustable so that any desired action may be obtained. Thus in certain instances, it may be desirable to have the temperature rise appreciably above the value corresponding to the cold position of the thermostat before the auxiliary heater is energized.

In Figures 2 and 3 modifications of the subject of invention are disclosed. Inasmuch as the temperature control system is identical with the exception of the thermostat it is deemed unnecessary to illustrate the valve, the steam pipes and the radiators. Moreover, in order to further simplify the description the same reference characters have been applied to the corresponding elements of the control system and a description of those elements which are identical in structure and operation to the preferred species is omitted.

Referring to Figure 2, the thermostat 75 similar to the thermostat 45 of the preferred species consists of a bimetallic element 76 and a switch blade 77 adapted to engage with either of two contacts 78 and 79. The contact 78 is the cold contact and contact 79 the hot contact. Heater 80 is located adjacent the bimetallic element 76 and corresponds to heater 70 of the preferred species. Secured to the switch blade 77 is an auxiliary switch blade 81. This blade 81, unlike the blade 65, is electrically connected to switch blade 77. The blade 81 is relatively flexible and cooperates with a contact 82. The contact 82 is connected through conductor 83 with one terminal of heater 80, the other terminal of which is connected through conductor 84 with contact 79.

In this species the circuit to heater 80 is as follows: from the upper terminal of secondary 27 through conductors 52 and 53, bimetallic element 76, switch blade 77, switch blade 81, contact 82, conductor 83, heater 80, conductors 84 and 61, contact 40, switch blade 33, conductors 55 and 56, field winding 16 and conductor 58 to the other terminal of secondary 27. It will be noted that the circuit to heater 80 includes in series the switch consisting of switch blade 81 and contact 82 and the switch consisting of switch blade 33 and contact 40. It will thus be seen that the energizing circuit for heater 80 is similar to that for heater 70 in the preferred species in that it is controlled jointly by a cycling switch and by a switch one element of which is carried by the switch blade of the thermostatic controller. The principal difference between the two species is in the location of the heater 80 in the circuit. As in the preferred species, switch blade 81 is so arranged that it is separated from contact 82 only when switch blade 77 is in engagement with or near contact 78. It is believed unnecessary to further describe the operation of the species of Figure 2 since it is obvious that it operates in the same manner as Figure 1.

In Figure 3 a slightly different arrangement of the thermostat is employed. In this figure the thermostat is designated by the reference numeral 85 and comprises a bimetallic element 86, and a main switch blade 87 which electrically cooperates with contacts 88 and 89. The contact 88 constitutes a cold contact and the contact 89 a hot contact. A heater 90 is located in proximity to the bimetallic element 86. Secured to but insulated from main switch blade 87 is an auxiliary flexible switch blade 91. A suitable block of insulating material 92 is interposed between the auxiliary switch blade 91 and the main switch blade 87. The heater 90 is connected between the blade 91 and the bimetallic element 86 in the same manner in which the heater 70 is connected in the preferred species. In this species no separate contact is provided for cooperating with the blade 91, the blade 91 moving directly into engagement with the hot contact 89 and remaining in engagement therewith except when switch blade 87 is in engagement with or near the cold contact 88. The engagement between switch blade 87 and hot contact 89 is effected by switch blade 87 moving into engagement with switch blade 91 and establishing a circuit through this switch blade to the hot contact 89. It will be readily apparent that the operation of this species is identically the same as that of Figure 1 with the exception of the above described manner in which electrical engagement of arm 87 with its hot contact is effected. The switch consisting of switch blade 91 and contact 89 corresponds in function to the switch of Figure 1 consisting of switch blade 65 and contact 67.

While the invention has been shown as applied to a temperature control system, it is to be understood that the same is not to be so limited. In certain other types of condition control systems, it is also desirable to anticipate the change in condition and to increase the rate of movement of the condition responsive controller above that caused by the change in the controlling condition. The present invention is equally applicable to such a condition responsive system. Furthermore, while the device has been shown as embodied in an electrical control system it is again to be understood that it is not to be so limited. The particular method of transmitting the motions of the thermostat to the control of the operation of some motor means may not be electrical but may, for example, be based on transmission by air pressure.

In general, while I have shown the specific embodiment of my invention it should be understood that this is for purposes of illustration only and that my invention is to be limited only by the scope of the appended claims.

I claim as my invention:

1. In a temperature control system, temperature changing apparatus, a power operated regulator therefor movable between heat increasing and heat decreasing positions, a temperature responsive controller movable between hot and cold positions, a source of motive power, connections between said source of power, said temperature responsive controller and said regulator effective upon said controller assuming its hot or cold position to so apply power to the regulator as to cause it to move to its heat decreasing or heat increasing position respectively and accelerating means immediately effective when said regulator is in one of said extreme positions and upon the temperature changing from the value required to cause the controller to move to the extreme position corresponding to the extreme position of the regulator in a direction such as to cause the controller to move towards its other position to cause said controller to move towards said other position at a rate faster than that which would result merely from the normal temperature change of the controlling medium, said accelerating means being ineffective so long as the value of the temperature does not change from that necessary to move the controller to the extreme position corresponding to the position of the regulator in a direction such as to cause the controller to move towards its other extreme position so that said regulator is in said one extreme position for a variable period of time determined by both the effect of said accelerating means and the time required for the temperature of the controlling medium to change sufficiently to place said accelerating means in operation.

2. In a temperature control system, temperature changing apparatus, an electrically operated regulator therefor movable between heat increasing and heat decreasing positions, a thermostatic switch including a switch blade movable between hot and cold contacts, a source of electric energy, circuit connections between said source of energy, said thermostatic switch and said regulator effective upon said switch blade moving into engagement with either its hot or cold contact to so control the energization of the regulator as to cause it to move to its heat decreasing or heat increasing position respectively, and means for locally heating said thermostatic switch, said means being effective only when said regulator is in its heat increasing position and upon the temperature of the controlling medium rising to a predetermined value and being ineffective so long as the temperature is at or below the value at which said thermostatic switch blade engages its cold contact so that said regulator is in its heat increasing position for a variable period of time determined by both the heating effect of said local heating means and the time required for the temperature of the controlling medium to rise to said predetermined value.

3. In a temperature control system, temperature changing apparatus, an electrically operated regulator therefor movable between heat increasing and heat decreasing positions, a thermostatic switch including a switch blade movable between hot and cold contacts, a source of electric energy, circuit connections between said source of energy, said thermostatic switch and said regulator effective upon said switch blade moving into engagement with either its hot or cold contact to so energize the regulator as to cause it to move to its heat decreasing or heat increasing position respectively, an electrical heater for locally heating said thermostatic switch, and circuit means for connecting said heater to said source of energy, said circuit means being controlled jointly by a switch closed only when said regulator is in its heat increasing position and a switch which is normally closed except when the temperature in the space in which said thermostatic switch is located is below a predetermined value corresponding to or higher than that necessary to cause engagement of said thermostatic switch blade with its cold contact but lower than that at which the thermostatic switch blade would normally engage its hot contact.

4. In a temperature control system, temperature changing apparatus, an electrically operated regulator therefor movable between heat increasing and heat decreasing positions, a thermostatic switch including a switch blade movable between hot and cold contacts, a source of electric energy, circuit connections between said source of energy, said thermostatic switch and said regulator effective upon said switch blade moving into engagement with either its hot or cold contact to so energize the regulator as to cause it to move to its heat decreasing or heat increasing position respectively, an electrical heater for locally heating said thermostatic switch, and circuit means for connecting said heater to said source of energy, said circuit means being controlled jointly by a switch closed only when said regulator is in its heat increasing position and a switch which is normally closed except when the temperature in the space in which said thermostatic switch is located is below a predetermined value lower than that at which the thermostatic switch blade would normally engage its hot contact, said last named switch comprising a stationary element and a relatively movable element, the relatively movable element being mounted so as to be movable with said thermostatic switch blade.

5. In a temperature control system, temperature changing apparatus, an electrically operated regulator therefor movable between heat increasing and heat decreasing positions, a thermostatic switch including a switch blade movable between hot and cold contacts, a source of electric energy, circuit connections between said source of energy, said thermostatic switch and said regulator effective upon said switch blade moving into engagement with either its hot or cold contact to so energize the regulator as to cause it to move to its heat decreasing or heat increasing position respectively, an electrical heater for locally heating said thermostatic switch, and circuit means for connecting said heater to said source of energy, said circuit means being controlled jointly by a switch closed only when said regulator is in its heat increasing position and a switch which is normally closed except when the temperature in the space in which said thermostatic switch is located is below a predetermined value lower than that at which the thermostatic switch blade would normally engage its hot contact, said last named switch comprising a stationary contact and a switch blade secured to and insulated from said thermostatic switch blade.

6. In a temperature control system, temperature changing apparatus, an electrically operated regulator therefor movable between heat increasing and heat decreasing positions, a thermostatic switch including a switch blade movable between hot and cold contacts, a source of electric energy, circuit connections between said source of energy, said thermostatic switch and said regulator effective upon said switch blade moving into engagement with either its hot or cold contact to so energize the regulator as to cause it to move to its heat decreasing or heat increasing position respectively, an electrical heater for locally heating said thermostatic switch, and circuit means for connecting said heater to said source of energy, said circuit means being controlled jointly by a switch closed only when said regulator is in its heat increasing position and a switch which is normally closed except when the temperature in the space in which said thermostatic switch is located is below a predetermined value lower than that at which the thermostatic switch blade would normally engage its hot contact, said last named switch comprising a stationary contact and an auxiliary flexible switch blade mounted on and electrically connected to said thermostatic switch blade.

7. In a temperature control system, temperature changing apparatus, an electrically operated regulator therefor movable between heat increasing and heat decreasing positions, a thermostatic switch including a switch blade movable between hot and cold contacts, a source of electric energy, circuit connections between said source of energy, said thermostatic switch and said regulator effective upon said switch blade moving into engagement with either its hot or cold contact to so energize the regulator as to cause it to move to its heat decreasing or heat increasing position respectively, an electrical heater for locally heating said thermostatic switch, and circuit means for connecting said heater to said source of energy, said circuit means being controlled jointly by a switch closed only when said regulator is in its heat increasing position and a switch which is normally closed except when the temperature in the space in which said thermostatic switch is located is below a predetermined value lower than that at which the thermostatic switch blade would normally engage its hot contact, said last named switch comprising a flexible switch blade mounted on and insulated from said thermostatic switch blade and which is in engagement with said cold contact when the temperature is above said predetermined value.

GILBERT A. CHURCHILL.